United States Patent
Siddique et al.

(10) Patent No.: US 10,698,377 B2
(45) Date of Patent: Jun. 30, 2020

(54) METHOD AND SYSTEM FOR CONFIGURING PROGRAMMABLE IO CONTROLLERS AND SEARCHING CONNECTABLE IO MODULES THEREOF

(71) Applicant: INTELLIGENT PLATFORMS, LLC, Charlottesville, VA (US)

(72) Inventors: Abitha Beevi Mohammed Siddique, Hyderabad (IN); Venkatesh Mani Selvaraj, Hyderabad (IN); Balajose Goli, Hyderabad (IN); Vishal Fogla, Hyderabad (IN); Shantanu Ratnakar Rao Choudhary, Hyderabad (IN)

(73) Assignee: INTELLIGENT PLATFORMS, LLC, Charlottesville, VA (US)

( * ) Notice: Subject to any disclaimer, the term of this patent is extended or adjusted under 35 U.S.C. 154(b) by 444 days.

(21) Appl. No.: 15/186,995

(22) Filed: Jun. 20, 2016

(65) Prior Publication Data
US 2017/0364045 A1 Dec. 21, 2017

(51) Int. Cl.
G05B 19/042 (2006.01)
(52) U.S. Cl.
CPC .. *G05B 19/0423* (2013.01); *G05B 2219/1138* (2013.01); *G05B 2219/13144* (2013.01); *G05B 2219/21086* (2013.01)
(58) Field of Classification Search
None
See application file for complete search history.

(56) References Cited

U.S. PATENT DOCUMENTS

| | | | | |
|---|---|---|---|---|
| 5,267,145 A | * | 11/1993 | Zifferer | G05B 19/058 700/86 |
| 5,867,382 A | * | 2/1999 | McLaughlin | G05B 19/056 700/17 |
| 6,609,108 B1 | * | 8/2003 | Pulliam | G06Q 10/087 705/26.5 |
| 7,546,362 B2 | | 6/2009 | Kroger et al. | |

(Continued)

FOREIGN PATENT DOCUMENTS

| CN | 201957041 U | 8/2011 |
|---|---|---|
| CN | 203522776 U | 4/2014 |

OTHER PUBLICATIONS

Hanzalek et al., "Profinet IO IRT Message Scheduling With Temporal Constraints", Industrial Informatics, IEEE Transactions on, vol. 6, Issue 3, pp. 369-380, Aug. 2010.

(Continued)

*Primary Examiner* — Cory W Eskridge
(74) *Attorney, Agent, or Firm* — Marshall, Gerstein & Borun LLP

(57) ABSTRACT

The exemplified methods and systems facilitates the configuring of IO devices and its IO modules (and submodules) in enabling an operator to retrieve, via a single input, in a development workspace, a list of IO modules and submodules that is compatible to a given IO device. The exemplified methods and systems facilitates retrieval of compatible IO modules and submodules based parameters of the IO modules and submodules. The exemplified methods and systems provide an intuitive interface, in a development workspace for configuring an IO device, to add a retrieved (i.e., searched) module or submodule from a list thereof to an existing project for a given IO device.

18 Claims, 16 Drawing Sheets

(56) References Cited

U.S. PATENT DOCUMENTS

| | | |
|---|---|---|
| 7,949,754 B2 | 5/2011 | Lessman |
| 8,433,827 B2 | 4/2013 | Biehler |
| 9,178,760 B2 | 11/2015 | Lessmann et al. |
| 2002/0174084 A1* | 11/2002 | Mitsugi ............... G01C 21/3608 |
| 2007/0079250 A1* | 4/2007 | Bump ................ G05B 23/0216 |
| | | 715/762 |
| 2011/0055787 A1* | 3/2011 | Stowers .................. G06F 17/50 |
| | | 716/126 |
| 2014/0122754 A1 | 5/2014 | Gutermuth et al. |
| 2014/0341220 A1 | 11/2014 | Lessmann |

OTHER PUBLICATIONS

Gilani et al., "An app-based approach for reconfigurable field devices", IEEE Emerging Technology and Factory Automation, pp. 1-4, Sep. 2014.

* cited by examiner

FIG. 6

```
<!--============-->
<!--IC693ACC300-->
<!--============-->
<Text TextId="IDT_MODULE_NAME_3ACC300_8" Value="IC693ACC300: Input Simulator Module 8pt Mode"/>
<Text TextId="IDT_MODULE_INFO_3ACC300_8" Value="The IC693ACC300 has either 8 or 16 discrete DC inputs. This selection supports the DIP switch in the 8Pt position."/>
<Text TextId="IDT_MODULE_NAME_3ACC300_16" Value="IC693ACC300: Input Simulator Module 16pt Mode"/>
<Text TextId="IDT_MODULE_INFO_3ACC300_16" Value="The IC693ACC300 has either 8 or 16 discrete DC inputs. This selection supports the DIP switch in the 16Pt position."/>
```

FIG. 7A

```
<!--============-->
<!--IC693MDL230-->
<!--============-->
<Text TextId="IDT_MODULE_NAME_3MDL230" Value="IC693MDL230: 8 Circuit Input 120 VAC Isolated"/>
<Text TextId="IDT_MODULE_INFO_3MDL230" Value="The IC693MDL230 has 8 discrete AC isolated inputs. The inputs accept 120 VAC nominal."/>
```

FIG. 7B

```
<!--IC693MDL231-->
<!--============-->
<Text TextId="IDT_MODULE_NAME_3MDL231" Value="IC693MDL231: 8 Circuit Input 240 VAC Isolated"/>
<Text TextId="IDT_MODULE_INFO_3MDL231" Value="The IC693MDL231 has 8 discrete AC isolated inputs. The inputs accept 240 VAC nominal."/>
```

FIG. 7C

```
<!--==============-->
<!--IC693MDL240-->
<!--==============-->
<Text TextId="IDT_MODULE_NAME_3MDL240" Value="IC693MDL240: 16 Circuit Input 120 VAC"/>
<Text TextId="IDT_MODULE_INFO_3MDL240" Value="The IC693MDL240 has 16 discrete AC inputs. The inputs accept 120 VAC nominal."/>
```

FIG. 7D

```
<!--==============-->
<!--IC693MDL241-->
<!--==============-->
<Text TextId="IDT_MODULE_NAME_3MDL241" Value="IC693MDL241: 16 Circuit Input 24 VDC"/>
<Text TextId="IDT_MODULE_INFO_3MDL241" Value="The IC693MDL241 has 16 discrete AC/DC inputs. The inputs accept 24 VAC/VDC nominal."/>
```

FIG. 7E

```
<!--==============-->
<!--IC693MDL250-->
<!--==============-->
<Text TextId="IDT_MODULE_NAME_3MDL250" Value="IC693MDL250: 16 Circuit Isolated Input 120 VAC, Input Filtering Off"/>
<Text TextId="IDT_MODULE_INFO_3MDL250_FILT_OFF" Value="The IC693MDL250 has 16 discrete isolated AC inputs. The inputs accept 120 VAC nominal. The Input Filtering DIP Switch is in the Disabled position."/>
<Text TextId="IDT_MODULE_NAME_3MDL250_FILT_ON" Value="IC693MDL250: 16 Circuit Isolated Input 120 VAC, Input Filtering On"/>
<Text TextId="IDT_MODULE_INFO_3MDL250_FILT_ON" Value="The IC693MDL250 has 16 discrete isolated AC inputs. The inputs accept 120 VAC nominal. The Input Filtering DIP Switch is in the Enabled position."/>
```

FIG. 7F

```
<!--==========-->
<!--IC693MDL260-->
<!--==========-->
<Text TextId="IDT_MODULE_NAME_3MDL260_FILT_OFF" Value="IC693MDL260: 32 Circuit Input 120 VAC, Input Filtering Off"/>
<Text TextId="IDT_MODULE_INFO_3MDL260_FILT_OFF" Value="The IC693MDL260 has 32 discrete AC inputs. The inputs accept 120 VAC nominal. The Enable Filtering DIP Switch is in the Disabled position."/>
<Text TextId="IDT_MODULE_NAME_3MDL260_FILT_ON" Value="IC693MDL260: 32 Circuit Input 120 VAC, Input Filtering On"/>
<Text TextId="IDT_MODULE_INFO_3MDL260_FILT_ON" Value="The IC693MDL260 has 32 discrete AC inputs. The inputs accept 120 VAC nominal. The Enable Filtering DIP Switch is in the Enabled position."/>
```

FIG. 7G

```
<!--==========-->
<!--IC693MDL632-->
<!--==========-->
<Text TextId="IDT_MODULE_NAME_3MDL632" Value="IC693MDL632: 8 Circuit Input 125 VDC Positive / Negative Logic"/>
<Text TextId="IDT_MODULE_INFO_3MDL632" Value="The IC693MDL632 has 8 discrete DC inputs. The inputs accept 125 VDC nominal."/>
```

FIG. 7H

```
<!--==========-->
<!--IC693MDL634-->
<!--==========-->
<Text TextId="IDT_MODULE_NAME_3MDL634" Value="IC693MDL634: 8 Circuit Input 24 VDC Positive / Negative Logic"/>
<Text TextId="IDT_MODULE_INFO_3MDL634" Value="The IC693MDL634 has 8 discrete DC inputs. The inputs accept 24 VDC nominal."/>
```

FIG. 7I

```
<!--============-->
<!--IC693MDL635-->
<!--============-->
<Text TextId="IDT_MODULE_NAME_3MDL635" Value="IC693MDL635: 16 Circuit Input 125 VDC Positive / Negative Logic"/>
<Text TextId="IDT_MODULE_INFO_3MDL635" Value="The IC693MDL635 has 16 discrete DC inputs. The inputs accept 125 VDC nominal."/>
```

FIG. 7J

```
<!--============-->
<!--IC693MDL645-->
<!--============-->
<Text TextId="IDT_MODULE_NAME_3MDL645" Value="IC693MDL645: 16 Circuit Input 24 VDC Positive / Negative Logic"/>
<Text TextId="IDT_MODULE_INFO_3MDL645" Value="The IC693MDL645 has 16 discrete DC inputs. The inputs accept 24 VDC nominal."/>
```

FIG. 7K

```
<!--============-->
<!--IC693MDL646-->
<!--============-->
<Text TextId="IDT_MODULE_NAME_3MDL646" Value="IC693MDL646: 16 Circuit Input 24 VDC Positive / Negative Logic Fast"/>
<Text TextId="IDT_MODULE_INFO_3MDL646" Value="The IC693MDL646 has 16 discrete fast DC inputs. The inputs accept 24 VDC nominal."/>
```

| | | Action | Version | Slots # | Port(s) | Description | Order Number | |
|---|---|---|---|---|---|---|---|---|
| ⊟ GE Intelligent Platforms | | | | | | | | |
| | ⊞ GSDML-V2.0-GEIP-RSTI-STXPNS-20131112.ZIP | | | | | | | |
| | ⊞ GSDML-V2.2-GEIP-VERSAPOINTPNS001-20130829.ZIP | | | | | | | |
| | ⊞ GSDML-V2.25-GEIP-RX3IPNS-20130212.ZIP | | | | | | | |
| | ⊞ GSDML-V2.3-GEIP-PAC8000PNS-20131113.ZIP | | | | | | | |
| | ⊞ GSDML-V2.3-GEIP-RX3ICEP-20131030.ZIP | | | | | | | |
| | ⊞ GSDML-V2.3-GEIP-RX3IPNS-20140527.ZIP | | | | | | | |
| | ⊞ GSDML-V2.3-GEIP-VERSAMAXPNS-20130426.ZIP | | | | | | | |
| | ⊞ GSDML-V2.0-GEIP-SAMPLE-20131112.xml | | | | | | | |
| | ⊞ GSDML-V2.0-GEIP-SAMPLE1-20131112.xml | | | | | | | |
| ⊟ SIEMENS | | | | | | | | |
| | ⊞ gsdml-v1.0-siemens-et200s-20050802.xml | | | | | | | |
| ⊞ General Electric | | | | | | | | |
| ⊞ WAGO Kontakttechnik GmbH u. Co. KG | | | | | | | | |

PROFINET GSDML Manager (PPNG-L21R)

Search

Browse and import

⇆ Export GSDML   🗑 Delete GSDML

● 0 Errors   ⚠ 0 Warnings   💬 0 Messages

Close

METHOD AND SYSTEM FOR CONFIGURING PROGRAMMABLE IO CONTROLLERS AND SEARCHING CONNECTABLE IO MODULES THEREOF

FIELD OF THE DISCLOSURE

Embodiments of the disclosure generally relate to controls of industrial systems, and more particularly methods and systems for managing and configuring controllers therein.

BACKGROUND

Industrial automation systems can include tens to hundreds of controllers to monitor and control sets of subsystems. Examples of such applications include a power plant, a factory, a refinery, a power distribution site, a wind or solar farm, building systems, among others.

One type of controllers in an industrial automation system has slots to receive mountable input-output modules and submodules to tailor the IO of the controller for a specific industrial automation application. The individual input-output module and submodule may include numerous digital and analog input and/or output channels to monitor or sense a variety of different types of input signals such as thermocouple inputs, resistance temperature detectors (RTDs), currents, voltages, capacitances, inductances, and resistances, and provide corresponding outputs. Once coupled to the controller, the controller and its input-output modules (and submodules thereof) are programmably configurable, via a development software, with a specific hardware configuration for each respective input-outputs.

As industrial communication networks grow in complexity, the configuration of devices in such industrial networks becomes a resource-intensive endeavor. For example, each individual controller, such as programmable logic controllers and supervisory control and data acquisition (SCADA) systems, may have tens to hundreds of input-output modules and submodules. The process of configuring IO devices and modules (i.e., to establish configuration of the IO devices and modules) is, for the most part, a manual operation. That is, in the development software, an operator would set individual parameters for, for example, a given IO devices and its modules or submodules.

What are needed are devices, systems and methods that overcome challenges in the present art, some of which are described above.

SUMMARY

The exemplified methods and systems facilitate the configuring of IO devices and its IO modules (and submodules) by an operator in retrieving, via a single search input, in a development workspace, a list of IO modules and submodules that is compatible to slots of a given IO device. The retrieved compatible IO modules and submodules may be based on a class type (e.g., Profinet version), power consumption, dimension, operating temperature, number of port connectors, minimum update rate, number of IO modules per slot (or node), maximum data rate, number of supportable Daps, among others. To this end, an operator may retrieve, intuitively, e.g., from a device- or IO-module file, a comprehensive list of compatible IO modules and submodules for a given class of IO device based on parameters of the IO modules and submodules. Individual IO modules presented in the resulting list may be selected, e.g., by being dragged, from a presented IO list pane, to a configuration pane, in the development workspace. To this end, the exemplified methods and systems provide an intuitive interface, in the development workspace for configuring an IO device.

In addition, the exemplified methods and systems facilitates, via the user interface, a guided interface to leverage historical retrieved parameters and previously-built IO-device configuration (and its respective IO module configuration) as a baseline or initial configuration for a given IO-device configuration project. In some embodiments, the exemplified methods and systems facilitate the presentation, via the development workspace, of similar searches of compatible IO modules and submodules for a given IO device.

In some embodiments, the exemplified methods and systems facilitate the publication of popular IO device configurations and their respective IO modules and submodules.

According to an aspect, a method is disclosed for configuring a hardware device in an industrial automation system. The method includes, in a development workspace for configuring hardware configuration of a plurality of input-output (IO) modules each operatively connected to a slot of an IO hardware device, presenting, by a processor, via a display, i) on a first pane of the development workspace, one or more graphical elements each corresponding to an IO module slot associated with the IO hardware device, and ii) on the development workspace, a search input comprising a graphical element corresponding to an input text field; upon receiving an input character string in the input text field, determining, by the processor, one or more matched IO modules, from a collection of IO modules compatibly associated with the IO hardware device, having a hardware description value matching the input character string, wherein the hardware description value are associated with (e.g., loaded, duplicated, or indexed from) a hardware description file; presenting, by the processor, via the display, on a second pane of the development workspace, one or more graphical elements each corresponding to a given matched IO module; and upon receiving a selection (e.g., a "drag-and-drop" or a selection of corresponding checkboxes, or the like), in the second pane, of a presented graphical element corresponding to a matched IO module and, in the first pane, a presented IO module slot, updating presentation of the graphical element associated with the selected IO module slot with a graphical element associated with the selected IO module.

In some embodiments, the method includes retrieving, by the processor, hardware configuration data associated with the selected IO module; and updating, by the processor, software configuration of the development workspace, wherein the software configuration is subsequently converted to configuration instructions to be transmitted to the IO hardware device to configure hardware configuration of the plurality of IO modules connected thereto.

In some embodiments, the first and second panes proximally border each other.

In some embodiments, the graphical element comprising the input text field is presented in a pane selected from the group consisting of the first pane (e.g., presenting the IO module slot), the second pane (e.g., the search result pane), and a third pane of the development workspace.

In some embodiments, the step of determining the one or more matched IO modules comprises comparing the received character string to hardware description of each IO modules compatibly associated with the IO hardware device.

In some embodiments, the hardware description of a given IO module comprises IO description data selected from the group consisting of: a number of analog inputs, a number of analog outputs, a number of digital inputs, and a number of digital outputs.

In some embodiments, the input character string comprises a string value corresponding to a slot-compatible search, the method comprising: parsing, by the processor, hardware description of each IO modules compatibly associated with the IO hardware device; and for each TO module having a hardware description determined to have an operable slot range value that includes the string value corresponding to the slot-compatible search, presenting, by the processor, on the second pane of the development workspace, a graphical element corresponding to the given IO module.

In some embodiments, the step of parsing hardware description of each IO modules compatibly associated with the IO hardware device comprises: parsing each hardware description data associated with each given IO module.

In some embodiments, the step of parsing hardware description of all IO modules compatibly associated with the IO hardware device comprises: determining a description type (e.g., an XML, attribute) for the input character string from a list of potential description type; and parsing hardware description data associated with a determined description type for each given IO module.

In some embodiments, the input character string comprises a string value corresponding to a power-limit-compatible search, the method comprises: determining, by the processor, an available power value for the IO hardware device by subtracting a maximum available power value for the IO hardware device with a current power usage value for a current configuration of the IO hardware device (e.g., wherein the current power usage value is determined by retrieving a power requirement value for each IO module presented in the first pane and aggregating the retrieved power-requirement values); parsing, by the processor, hardware description of power requirement value of each IO modules compatibly associated with the IO hardware device; and for each given IO module having, in the hardware description, a power requirement value less than the determined available power value, presenting, by the processor, on the development workspace (e.g., on the first, second, or third pane), a graphical element corresponding to the given IO module.

In some embodiments, method includes presenting, by the processor, via the display, in the development workspace, graphical representation of the available power value for the IO hardware device.

In some embodiments, the input character string comprises a string value corresponding to a temperature compatible search, the method comprising: parsing, by the processor, hardware description of each IO modules compatibly associated with the IO hardware device; and for each IO module having a hardware description determined to have an operable temperature operating range value that includes the string value corresponding to the temperature compatible search, presenting, by the processor, on the second pane of the development workspace, a graphical element corresponding to the given IO module.

In some embodiments, the input character string comprises a string corresponding to a dimensions-compatible search, the method comprising: parsing, by the processor, hardware description of each IO modules compatibly associated with the IO hardware device; and for each IO module having a hardware description determined to have a maximum dimension value less than the string value corresponding to the dimensions-compatible search, presenting, by the processor, on the second pane of the development workspace, a graphical element corresponding to the given IO module.

In some embodiments, the input character string comprises a string corresponding to a search parameter selected from the group consisting of Maximum Dimensions (e.g., length), Minimum Operating Temperature, Maximum Operating Temperature, Number of Port connectors, Minimum Update rate support, Number of analog IO channels per module, Number of digital IO channels per module, Number of temperature IO channels per module, Maximum TO data rate per device, and Number of Daps supported; the method includes determining, by the processor, a hardware description type associated with the search string type; and parsing, by the processor, hardware description of each IO modules compatibly associated with the IO hardware device; and for each IO module having a hardware description determined to have a value that meets the criteria of the search parameter, presenting, by the processor, on the second pane of the development workspace, a graphical element corresponding to the given IO module.

In some embodiments, the method includes presenting, by the processor, via the display, graphical representation of IO module configurations for a past-built IO hardware device, wherein the past-built IO hardware device has a first slot configuration and the IO hardware device has a second slot configuration, wherein the first slot configuration is the same with the second slot configuration.

In some embodiments, the method includes presenting, by the processor, via the display, graphical representation of one or more historical search string submitted for the given IO hardware device, wherein the historical search string includes a portion of the input character string.

In some embodiments, the method includes presenting, by the processor, via the display, graphical representation of most used IO modules for the IO hardware device.

According to another aspect, a system is disclosed for configuring an IO hardware device in an industrial automation system via a development workspace for configuring hardware configuration of a plurality of IO modules each operatively connected to a slot of the IO hardware device. The system includes a processor; a memory having instructions stored thereon, wherein the instructions, when executed by the processor, cause the processor to: present, via a display, i) on a first pane of the development workspace, one or more graphical elements each corresponding to an IO module slot associated with the IO hardware device, and ii) on the development workspace, a search input comprising a graphical element corresponding to an input text field; upon receiving a character string in the graphical element, determine one or more matched IO modules, from a collection of IO modules compatibly associated with the IO hardware device, having a hardware description value matching the input character string, wherein the hardware description value are associated with a hardware description file; present, via the display, on a second pane of the development workspace, one or more graphical elements each corresponding to a given matched IO module; and upon receiving a selection, in the second pane, of a presented graphical element corresponding to a matched IO module and, in the first pane, a presented IO module slot, update presentation of the graphical element associated with the selected IO module slot with a graphical element associated with the selected IO module.

According to another aspect, a computer readable medium is disclosed for configuring an IO hardware device in an industrial automation system. The computer readable medium having instructions stored thereon, wherein the instructions, when executed by the processor, cause the processor to: present, via a display, i) on a first pane of the development workspace, one or more graphical elements each corresponding to an IO module slot associated with the IO hardware device, and ii) on the development workspace, a search input comprising a graphical element corresponding to an input text field; upon receiving a character string in the graphical element, determine one or more matched IO modules, from a collection of IO modules compatibly associated with the IO hardware device, having a hardware description value matching the input character string, wherein the hardware description value are associated with (e.g., loaded, duplicated, or indexed from) a hardware description file; present, via the display, on a second pane of the development workspace, one or more graphical elements each corresponding to a given matched IO module; and upon receiving a selection, in the second pane, of a presented graphical element corresponding to a matched IO module and, in the first pane, a presented IO module slot, update presentation of the graphical element associated with the selected IO module slot with a graphical element associated with the selected IO module.

According to another aspect, a method is disclosed for searching hardware description data for an IO hardware device in an industrial automation system. The method includes: in a development workspace for configuring hardware configuration of a plurality of IO modules each operatively connected to a slot of an IO hardware device, presenting, by a processor, via a display, a search input comprising a graphical element corresponding to an input text field; upon receiving a character string in the graphical element corresponding to the input text field, determining one or more matched IO modules, from a collection of IO modules compatibly associated with the IO hardware device, having a hardware description value matching the input character string by parsing hardware description of each IO modules compatibly associated with the IO hardware device, wherein the hardware description value are associated with a hardware description file (e.g., a general station description (GSD) file or a GSD in XML format (GSDML) file); and presenting, by the processor, on the development workspace (e.g., on the first, second, or third pane), a graphical element corresponding to each of the determined matched IO modules.

BRIEF DESCRIPTION OF THE DRAWINGS

The accompanying drawings, which are incorporated in and constitute a part of this specification, illustrate embodiments and together with the description, serve to explain the principles of the methods and systems:

FIGS. 5 and 6 are screenshots of a development workspace that displays graphical elements associated with a list of compatible IO modules or submodules upon selection of a slot position or controller of the IO hardware device, in accordance with an embodiment.

FIG. 7, comprising FIGS. 7A, 7B, 7C, 7D, 7E, 7F, 7G, 7H, 7I, 7J, 7K, 7L, illustrates portions of a GSDML configuration file that are associated with the presented discrete input module shown in relation to FIG. 6, in accordance with an embodiment.

FIG. 12 is a screenshot of an example interface for loading a GSDML file having a collection of IO parameters and configuration parameters associated with a given IO device, in accordance with an embodiment.

DETAILED DESCRIPTION

Figure 1:
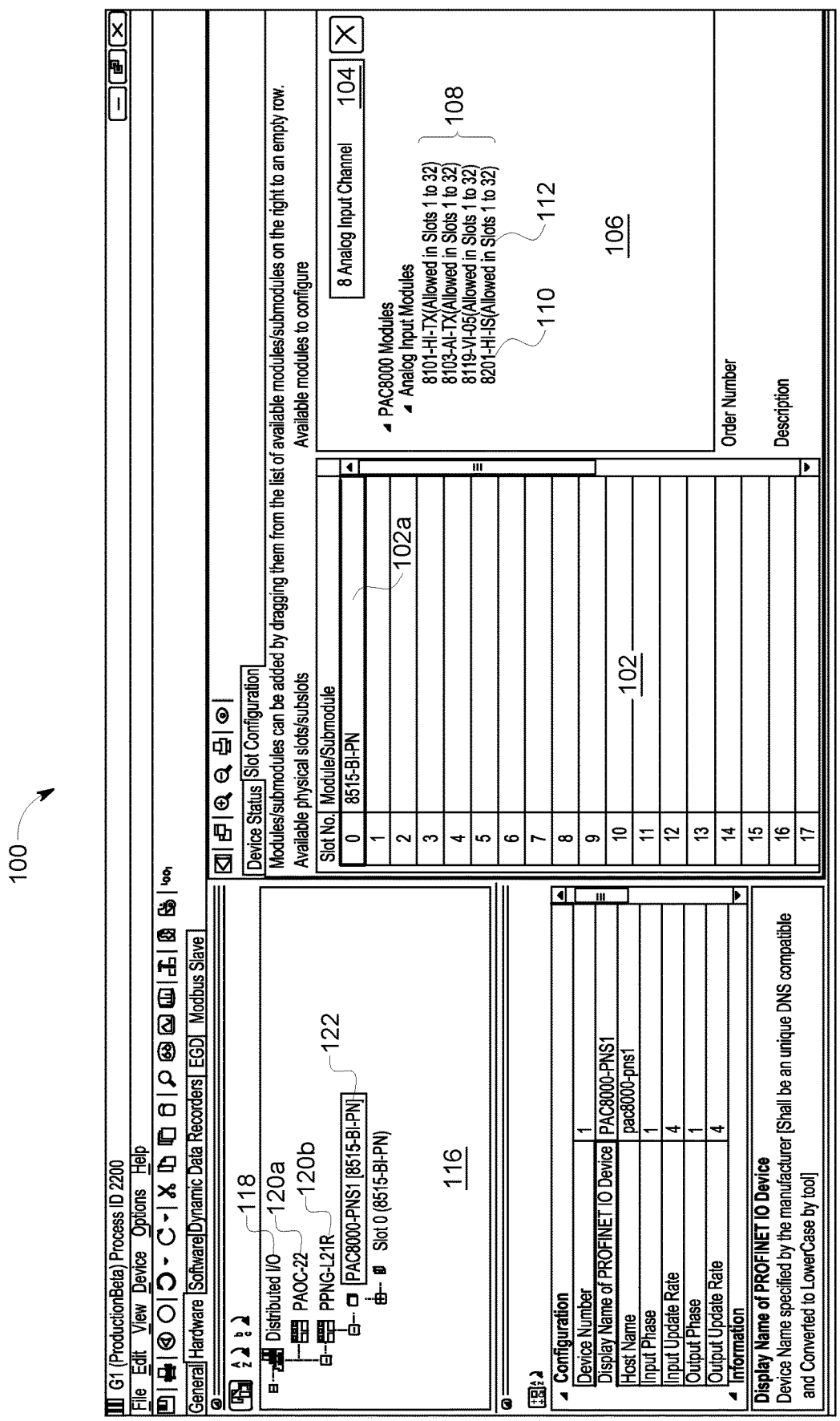
FIG. 1 is a screenshot of a development workspace for configuring an IO hardware device having a number of IO modules (or submodules), in accordance with an embodiment.

Unless defined otherwise, all technical and scientific terms used herein have the same meaning as commonly understood by one of ordinary skill in the art. Methods and materials similar or equivalent to those described herein can be used in the practice or testing of the present disclosure.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It is understood that throughout this specification the identifiers "first", "second", "third", "fourth", "fifth", "sixth", and such, are used solely to aid in distinguishing the various components and steps of the disclosed subject matter. The identifiers "first", "second", "third", "fourth", "fifth", "sixth", and such, are not intended to imply any particular order, sequence, amount, preference, or importance to the components or steps modified by these terms.

The present methods and systems may be understood more readily by reference to the following detailed description of preferred embodiments and the Examples included therein and to the Figures and their previous and following description.

FIG. 1 is a screenshot of a development workspace 100 for configuring an IO hardware device (e.g., a Programmable Automation Controller (PAC), a Programmable Logic Controller (PLC), a Supervisory Control and Data Acquisition (SCADA) System) having a number of IO modules (or submodules). The development workspace 100 presents on a first pane 102, one or more graphical elements (shown as 102a) each corresponding to an IO module or submodule slot associated with the IO hardware device, and on the development workspace, a search input comprising a graphical element 104 corresponding to an input text field.

In FIG. 1, main pane 116 shows a "Distributed I/O" 118 having two subsystems (shown as "PAOC-22" 120a and "PPNG-L21R" 120b). As shown, the "PPNG-L21R" subsystem 120b currently includes a programmable automation controller (shown as "PAC8000-PNS1 [8515-BI-PN]" 122) within the programmable configuration of the IO hardware device in the development workspace, where PAC8000-PNS1 denotes the IO system type, and 8515-BI-PN denotes a scanner module coupled thereto. As can be seen in FIG. 1, one or more IO hardware system (e.g., PAC, PLC, SCADA) may form a subsystem with a distributed IO control system. Selection of one of the IO hardware system, for a given subsystems, in main pane 116 causes the development workspace 100 to present module and submodule slot configurations for the selected IO hardware system.

Referring still to FIG. 1, in response to an input character string being provided in the input text field 104, the development workspace 100 presents on a second pane 106 of the development workspace, one or more graphical elements 108 each corresponding to a given matched IO module or submodule. The graphical elements 108 may include a module name 110 having an associated description that matches, wholly, or in part, the input character string. In some embodiments, the module name 110 may be presented along with descriptions of the module based on the type of searched performed. For example, in FIG. 1, upon an operator typing a channel type into the input text field 104, the module name 110 is presented along with compatible slot positions 112 to which a module corresponding to the module name may be inserted to the IO hardware device. For example, as shown, in response to an input of "8 Analog input channel", the development workspace 100 presents four compatible modules, including a "8101-HI-TX" analog input module, a "8103-AI-TX" analog input module, a "8119-VI-05" analog input module, and a "8201-HI-IS" analog input module. The "8101-HI-TX" module and "8201-HI-IS" module are connectable, to a module carrier via Railbus, to a high speed Bus Interface Module within the PAC8000-PNS1 system and each includes 8 channels of 4-20 mA analog inputs with HART (Highway Addressable Remote Transducer) capabilities. The "8103-AI-TX" module includes 8 channels of 4-20 mA analog inputs. The "8119-VI-05" module includes 8 channels of 1-5V analog inputs.

In an aspect, each of the graphical elements (e.g., 108) associated with the retrieved module from the performed search and presented in pane 106 are selectable to configure the slot configurations of the IO hardware device with the parameters of the selected IO module or submodule. To this end, the performed search and subsequent configuring action of the IO hardware device provides a user interface that improves the configuration of IO hardware device with IO slots in which the user does not have to manually input, into the development workspace, the IO module or submodule name or description. In addition, the searching for compatible IO modules or submodules and those with specific feature sets is fully integrated with the configuring operation of the programmable configuration profile for the IO hardware device in the development workspace.

Configuration of IO hardware device with IO slots in development workspace is often a labor-intensive and complex process. A given IO hardware device may be compatible with tens to several hundreds of different IO module types, which may have submodules for further customization. Although general station description (GSD) in XML format (GSDML) files provide libraries of hardware descriptions for a given class of development workspaces, these files are massive having thousands to tens of thousands of entries. In addition, there is no standard nomenclature among manufacturers and vendors for common hardware IO features nor are there standardized nomenclatures to describe proprietary hardware configurations. In addition, searching functions are limited to string and Boolean searches of the hard-coded description in the GSDML file. For these classes of development workspaces, GSDML and hardware XML files are imported and made available to the user independent of the programming and configuring of the programming of the IO hardware. In these classes of development workspaces, a separate search window is often employed.

Referring back to FIG. 1, in some embodiments, the development workspace is configured to facilitate selection of a retrieved IO module or submodule (from the performed search) in pane 106 and configuring of available slots in pane 102 via a drag and drop mechanism. To this end, graphical elements (e.g., 108) in pane 106 may be "dragged and dropped" onto a graphical element in pane 102, which causes the IO module or submodule associated with the selected graphical elements to be assigned to configuration profile for a IO hardware device.

Figure 2:
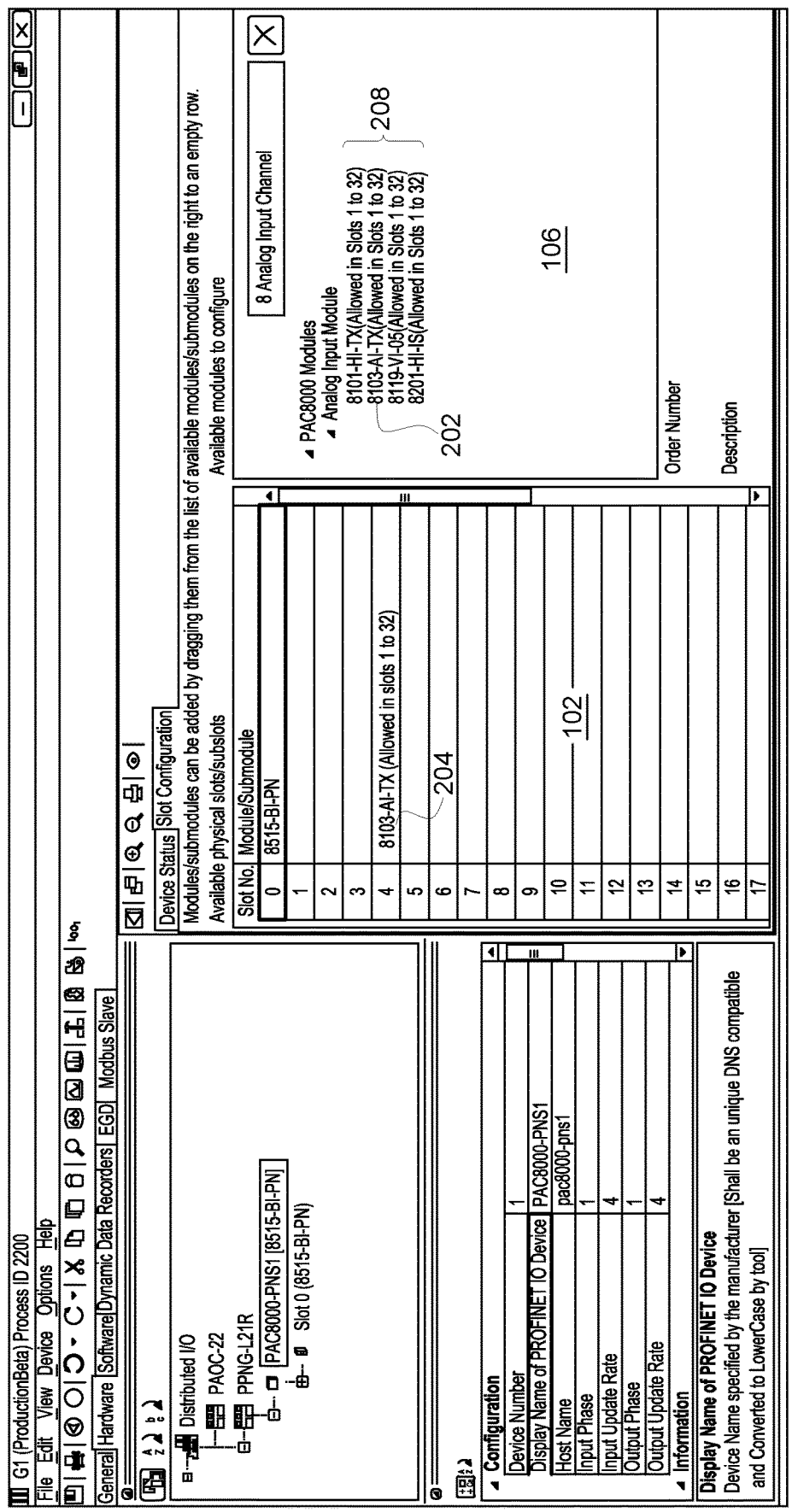
FIGS. 2 and 3 are diagrams illustrating an addition of a searched IO module to the operational configuration of an IO hardware device (e.g., via drag and drop operations), in accordance with an embodiment.
Figure 3:
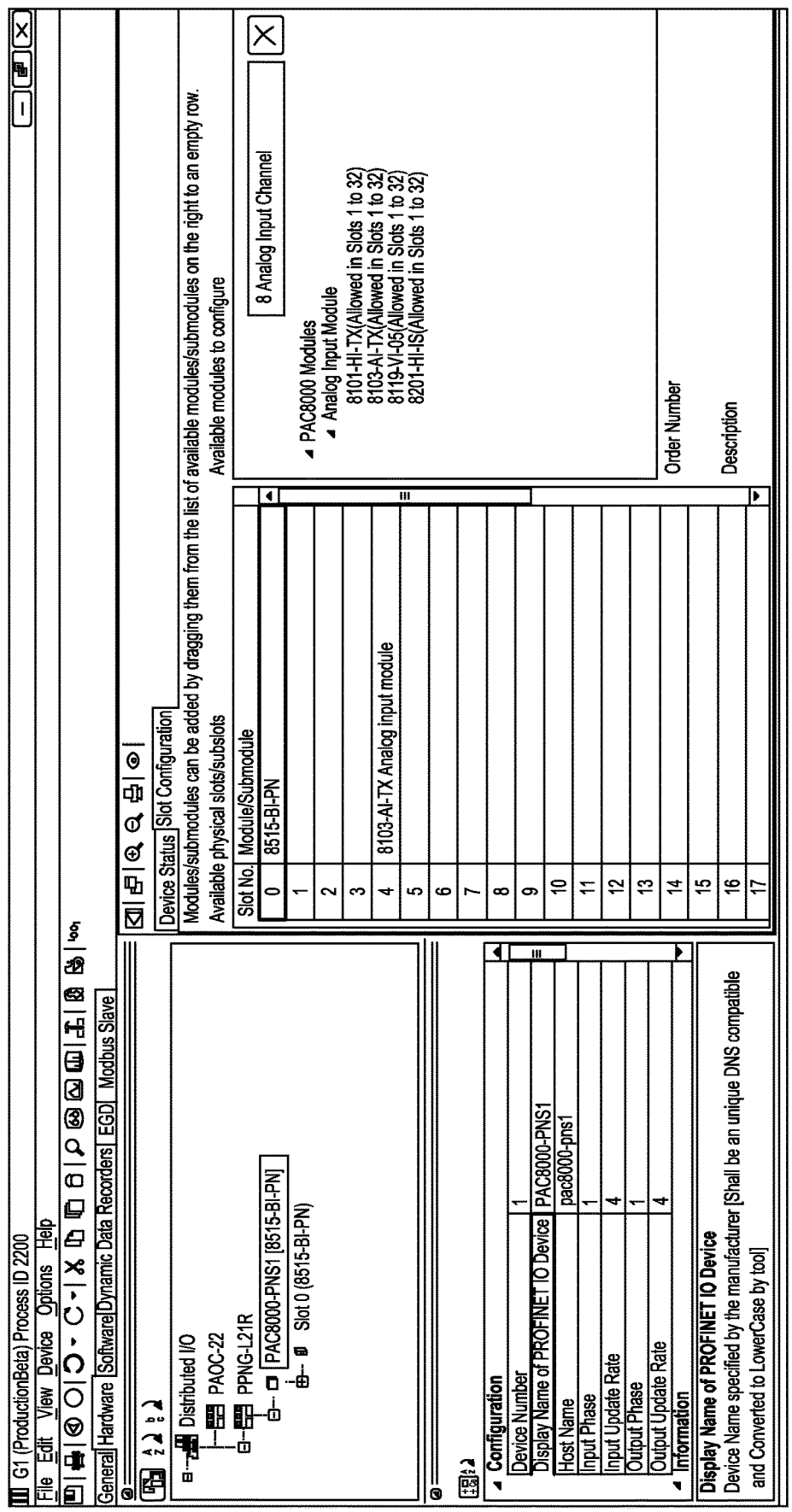

FIGS. 2 and 3 are diagrams illustrating an addition of a searched IO module to the operational configuration of an IO hardware device (e.g., via drag and drop operations). In FIG. 2, a first graphical element 202 (shown as "8103-AI-TX (Allowed in slots 1 to 32)") is selected in pane 106 and a second graphical element (shown as "slot 4" 204) is selected in pane 102. In some embodiments, the selection is presented as checkboxes, buttons, or other graphical widgets. In some embodiments, the selection is made via a "drag and drop" operation. As shown in FIG. 2, upon selection of the first graphical element 102 in pane 106 and the dragging of the first graphical element 102 into pane 102, the respective graphical element (corresponding to a slot position of the IO hardware device) in pane 102 to which the description of the selected IO module or submodule will be assigned is highlighted. In some embodiments, the development workspace 100 may highlight by a change of color, font, or style of the graphical element.

In some embodiments, upon a selection of a graphical element (e.g., 202) corresponding to a module or submodule from a list of retrieved results 108 in pane 106, the development workspace 100 may present highlight compatible slots of which the selected module or submodule may be applied. As shown in FIG. 2, the border is presented corresponding to the slot to which the selected IO module or submodule will be applied. In some embodiments, the development workspace 100 compares the IO slot position allowance value for a given IO module or submodule to a slot position value for the IO hardware device.

In response to the addition of a selected IO module (in pane 106) to a programmable slot position (in pane 102), the user interface (e.g., development workspace) is configured to retrieve hardware configuration data associated with the selected IO module and to update the software configuration in the development workspace of the IO hardware device. The software configuration is subsequently converted to configuration instructions to be transmitted to the IO hardware device to configure hardware configuration of the plurality of IO modules connected thereto. As shown in FIG. 2, the first and second panes proximally border each other.

In some embodiments, the searched parameters of IO modules and submodules are available based on a number of analog inputs, a number of analog outputs, a number of digital inputs, and a number of digital outputs. In some embodiments, the searched parameters are based on Maximum Dimensions (e.g., length), Minimum Operating Temperature, Maximum Operating Temperature, Number of Port connectors, Minimum Update rate support, Number of analog IO channels per module, Number of digital IO channels per module, Number of temperature IO channels per module, Maximum IO data rate per device, and Number of Daps supported.

In some embodiments, the input text field is configured to parse an input search to determine an intermediary parameter to compare to the parameters in a library of IO module and IO submodules. For example, the input text field, in some embodiments, is configured to receive a string value corresponding to a power compatible search. The development workspace is configured to determine a current maximum or present power usage by automatically summing individual current maximum power usage for each IO module presently associated with the IO device (e.g., used presented in the first pane 102). The development workspace may automatically retrieve a maximum power use for a given IO device to determine a power budget (as an available power parameter) available for additional IO modules or submodules. The development workspace may automatically compare the required power parameter for each IO module and IO submodule compatible to a given IO device and present those that have a required power parameter within the range of the available power parameter.

In some embodiments, the development workspace is configured to compare the inputted string to an index. For example, for the input, "allowed in", the development workspace is configured to auto-fill the input and present a remaining portion of the input as the input is provided into the search field. For example, upon receiving, "allo . . . ", the development workspace may present "Allowed in . . . " to guide the user to the command. In some embodiments, the development workspace is configured to present a list of potential options and to receive a selection of one of the presented options from the user. For example, the development workspace may present "Allowed in Slot 1", "Allowed in Slot 2", "Allowed in Slot 3", "Allowed in Slot 4", and etc., to which the user may select from a presented listed. In some embodiments, the development workspace is configured to automatically apply wild card features to an input string search and to disregard capitalization. In some embodiments, the development workspace may perform a spell check function on the inputted string and perform a comparison of both the spell-checked string and the input string to the repository of IO modules data and IO submodules data.

Figure 4:
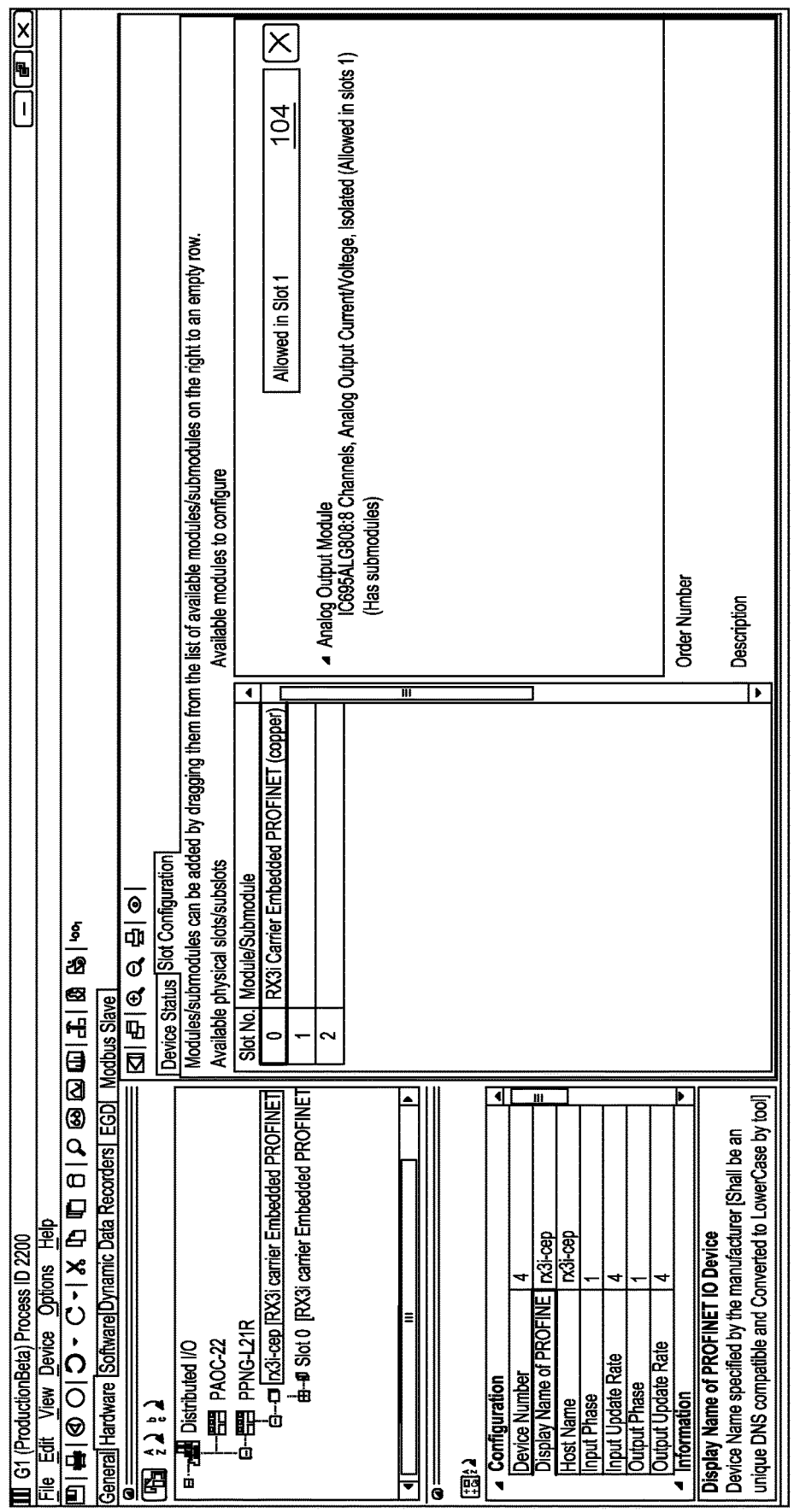
FIG. 4 is a screenshot configured to retrieve, via a search IO modules based on compatibility with a given slot position, in accordance with an embodiment

FIG. 4 is a screenshot configured to retrieve IO modules based on compatibility with a given slot position. Specifically, upon receiving a character input string ("Allowed in Slot 1") into input text field 104, the development workspace is configured to compare the inputted string to a repository of IO modules data and IO submodules data.

The development workspace 100 may maintain an index of searchable hardware description that is created from one or more XML files or Generic Station Description in XML format (GSDML) files. In some embodiments, the development workspace 100 may create the index from PROFINET Generic Station Description (GSD) in XML format (GSDML) configuration files. The index may be include a category for each IO hardware device type, a list or range of compatible slot positions on the IO hardware device, a list of discrete input modules, a list of discrete output modules, a list of discrete mixed modules, a list of analog input modules, a list of analog output modules, a list of analog mixed modules, a list of counter modules, a list of compatible power supply modules, a list of specialty modules, and a list of communication modules.

The index may include variations of the textual description for each list type. In some embodiments, a secondary search input is also accepted for finer searching. Examples are provided in Table 1. Table 2 provides a list of variations of the textual description for each submodule types.

TABLE 1

| | Primary Search Input | Secondary Search Input |
|---|---|---|
| Compatible Slot Positions | allowed in slot <no.> | |
| | allowed in slots <no.> | |
| | allow in slot <no.> | |
| | compatible with slot <no.> | |
| | compatible in slot <no.> | |
| | compatible with slot <no.> to <no.> | |
| | compatible with slot <no.>- | |

TABLE 1-continued

| | Primary Search Input | Secondary Search Input |
|---|---|---|
| | <no.><br>can be used in slot <no.><br>slot <no.> | |
| Discrete input modules | discrete input module*<br>discrete input*<br>discrete*<br>input module*<br>input*<br>in*<br><no.> | <no.> ac isolated input<br><no.>isolated input<br>ac isolated input*<br>ac isolate*<br>ac*<br><no.> vac input*<br><no.> vac*<br><no.> vdc input*<br><no.> vdc*<br><no.> dc input*<br><no.> dc*<br>fast dc*<br>ac/dc*<br>acdc* |
| Discrete output modules | discrete output module*<br>discrete output*<br>output module*<br>output*<br>out* | <no.> ac output<br>ac output*<br>ac*<br><no.> vac<br><no.> vac <no.><br>isolated output*<br>isolated*<br>isolate*<br>pneumatic outputs*<br>pneumatic*<br>normally open*<br>open*<br>normally close*<br>close*<br><no.> channel*<br><no.> chan |
| Discrete mixed modules | discrete mixed module*<br>discrete mixed*<br>mixed module*<br>mixed*<br>mix* | <no.> vac input*<br><no.> vac<br>relay output<br>relay input<br><no.> channel*<br><no.> chan<br><no.>v-<no.>v<br><no.>v to <no.>v<br><no.>a-<no.>a<br><no.>a to <no.>a<br>unipolar*<br>bipolar* |
| Analog input modules | analog input module*<br>analog input*<br>input module*<br>input*<br>in* | <no.> bit floating<br><no.> float<br><no.> differential*<br>differential*<br>diff*<br>4-20ma<br>420ma<br><no.> channel*<br><no.> chan*<br><no.>v-<no.>v<br><no.>v to <no.>v<br><no.>a-<no.>a<br><no.>a to <no.>a<br>unipolar*<br>bipolar* |
| Analog mixed modules | analog mixed module*<br>analog mixed*<br>mixed module*<br>mixed*<br>mix* | <no.> bit floating<br><no.> float<br><no.> differential*<br>differential*<br>diff*<br>4-20ma<br>420ma<br><no.> channel*<br><no.> chan*<br><no.>v-<no.>v<br><no.>v to <no.>v<br><no.>a-<no.>a<br><no.>a to <no.>a<br>unipolar*<br>bipolar* |
| Analog output modules | analog output module*<br>analog output*<br>output module* | non-isolated*<br>not isolated*<br>single-ended |

TABLE 1-continued

|  | Primary Search Input | Secondary Search Input |
| --- | --- | --- |
|  | output*<br>out* | differential*<br>diff*<br><no.> channel*<br><no.> chan* |
| Counter Modules | counter module*<br>counter*<br>count* | <no.> counter*<br>interrupt* |
| Power Supply Modules | power supply module*<br>power supply*<br>power module*<br>power*<br>supply module*<br>supply* | <no.>watt*<br><no.>w*<br>greater than <no.>w*<br>greater than <no.><br>> <no.>w*<br>> <no.><br>less than <no.>w*<br>less than <no.><br>< <no.>w*<br>< <no.> |
| Specialty Modules | specialty module*<br>specialty*<br>special* |  |
| Communication Modules | Communication module*<br>Communication*<br>Comm* | ethernet*<br>profinet*<br>gigabit*<br>fiber* |

In some embodiments, the search is performed on the categories in the index. In some embodiments, the search is performed on the categories in the index and on the description in the GSDML or XML file. In some embodiments, the search is performed on metadata or tags in the GSDML or XML file.

As stated above, Table 2 provides a list of variations of the textual description for each submodule types.

TABLE 2

| Discrete input submodules | discrete input submodule*<br>discrete input sub*<br>discrete sub*<br>input submodule*<br>input sub* |
| --- | --- |
| Discrete output submodules | discrete output submodule*<br>discrete output sub*<br>discrete sub*<br>output submodule*<br>output sub* |
| Analog input submodules | analog input submodule*<br>analog input sub*<br>analog sub*<br>input submodule*<br>input sub* |
| Analog output submodules | analog output submodule*<br>analog output sub*<br>analog sub*<br>output submodule*<br>output sub* |
| Analog mixed submodules | analog mixed submodule*<br>analog mixed sub*<br>analog sub*<br>mixed submodule*<br>mixed sub*<br>mix sub* |

In another aspect, the development workspace is configured to present, upon selection of a slot position or a controller of the IO hardware device, graphical elements associated with a list of compatible IO modules or submodules.

Figure 5:
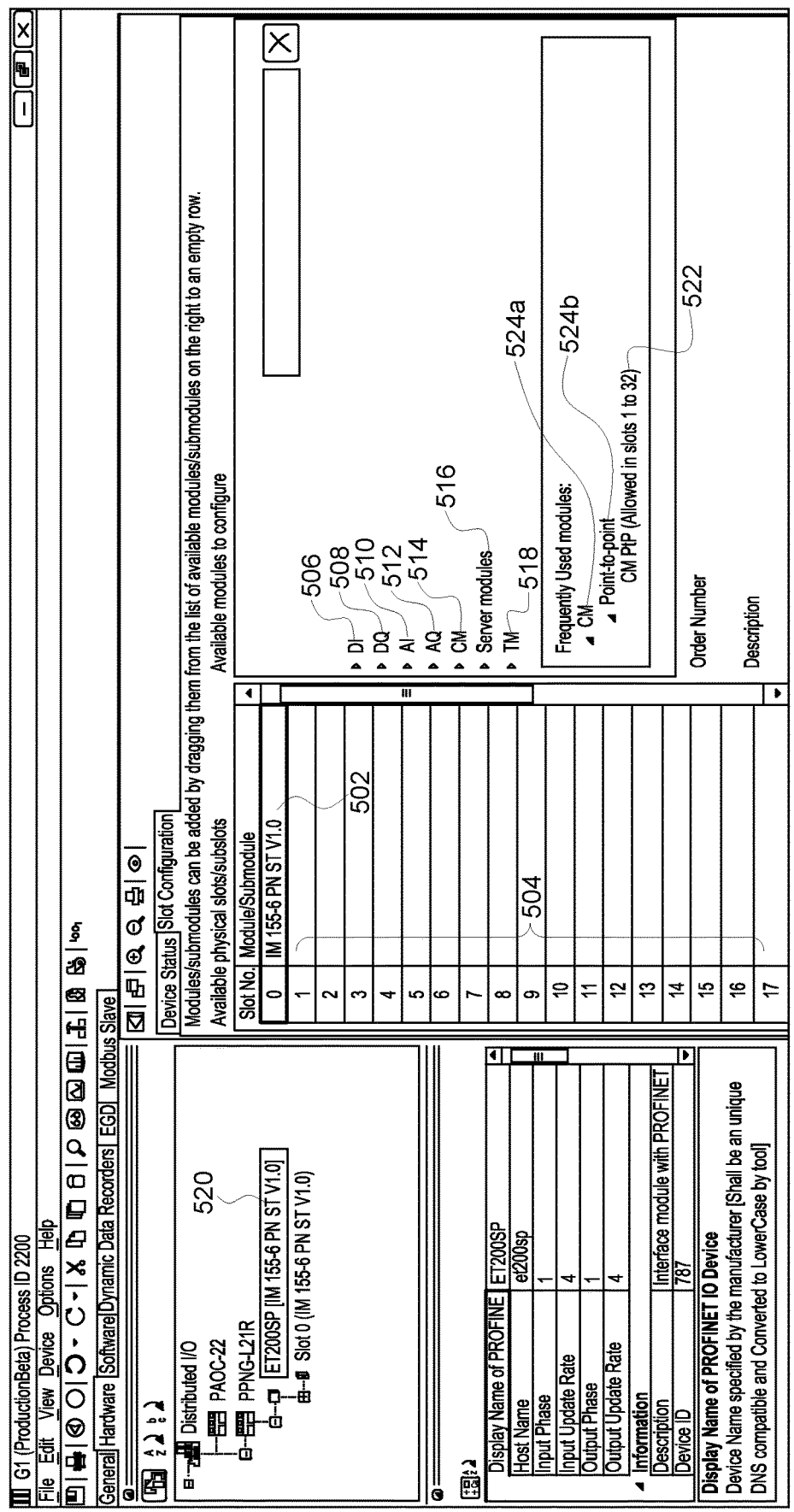
Figure 6:
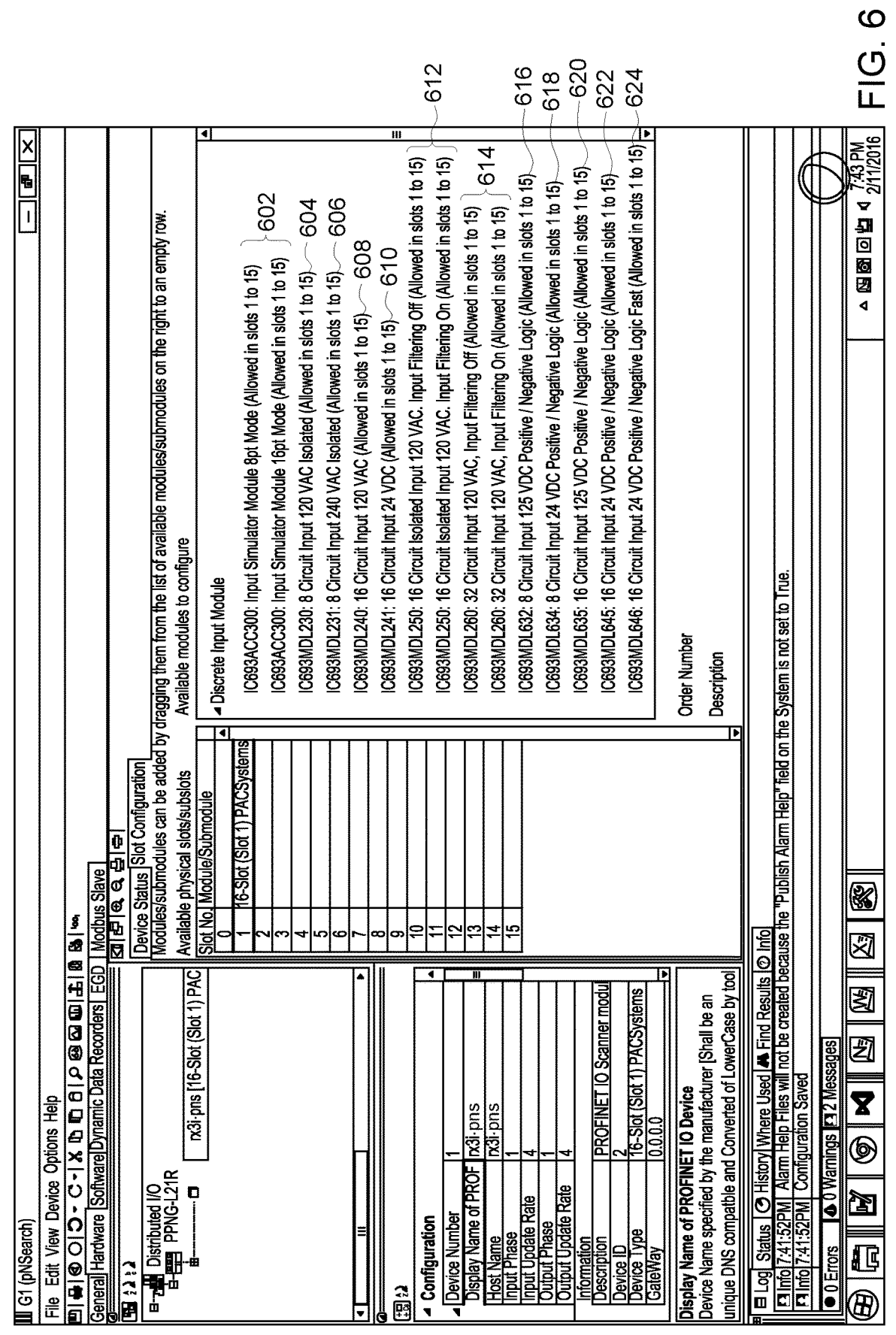

FIGS. 5 and 6 are screenshots of a development workspace that displays graphical elements associated with a list of compatible IO modules or submodules upon selection of a slot position or controller of the IO hardware device. In FIG. 5, upon selection of a slot position (e.g., any one of 504) or controller 502, the development workspace is configured to present a list of compatible modules and submodules. The development workspace are displayed, in some embodiments, arranged in accordance with categories of the compatible modules and submodules. In FIG. 5, the categories are shown as digital input modules ("DI" 506), digital output modules ("DQ" 508), analog input modules ("AI" 510"), analog output modules ("AQ" 512), counter modules ("CM" 514), controller modules ("Server modules" 516), and Timer modules ("TM" 518). The categories are associated with a class of devices referred to as "ET200SP". Other categories may be present depending on the available features of modules and submodules for a given class of device FIG. 6 illustrate an expanded list of compatible IO module for a given category. In FIG. 6, the IO modules are categories are associated with a class of devices referred to as "RX3i-PNS".

FIG. 7, comprising FIGS. 7A, 7B, 7C, 7D, 7E, 7F, 7G, 7H, 7I, 7J, 7K, 7L, illustrates portions of a GSDML configuration file that are associated with the presented discrete input module shown in relation to FIG. 6. That is, in FIG. 6, the discrete input module 602 is presented based on a GSDML description of the "IC693ACC300" module, the description of which is shown in FIG. 7A. The discrete input module 604 is presented based on a GSDML description of the "IC693MDL230" module, the description of which is shown in FIG. 7B. Similarly, the discrete input module 606 is presented based on the GSDML description shown in FIG. 7C; the discrete input module 608 is presented based on the GSDML description shown in FIG. 7D; the discrete input module 610 is presented based on the GSDML description shown in FIG. 7E; the discrete input module 612 is presented based on the GSDML description shown in FIG. 7F; the discrete input module 614 is presented based on the GSDML description shown in FIG. 7G; the discrete input module 616 is presented based on the GSDML description shown in FIG. 7H; the discrete input module 618 is presented based on with GSDML description shown in FIG. 7I; the discrete input module 620 is presented based on the GSDML description shown in FIG. 7J; the discrete input module 622 is presented based on the GSDML description shown in FIG. 7K; and the discrete input module 624 is presented based on the GSDML description shown in FIG. 7L.

As shown in FIG. 6, each of the module and/or submodule includes a module name and a textual description corresponding to a feature of the module. In certain instances, a given module may have two or more configurations (e.g., shown in 602, 612, and 614), which includes a corresponding number of module names and information.

Submodules Configuration

In some embodiments, the submodules of the IO hardware device is configurable via the "drag and drop" operation discussed above.

Figure 8:
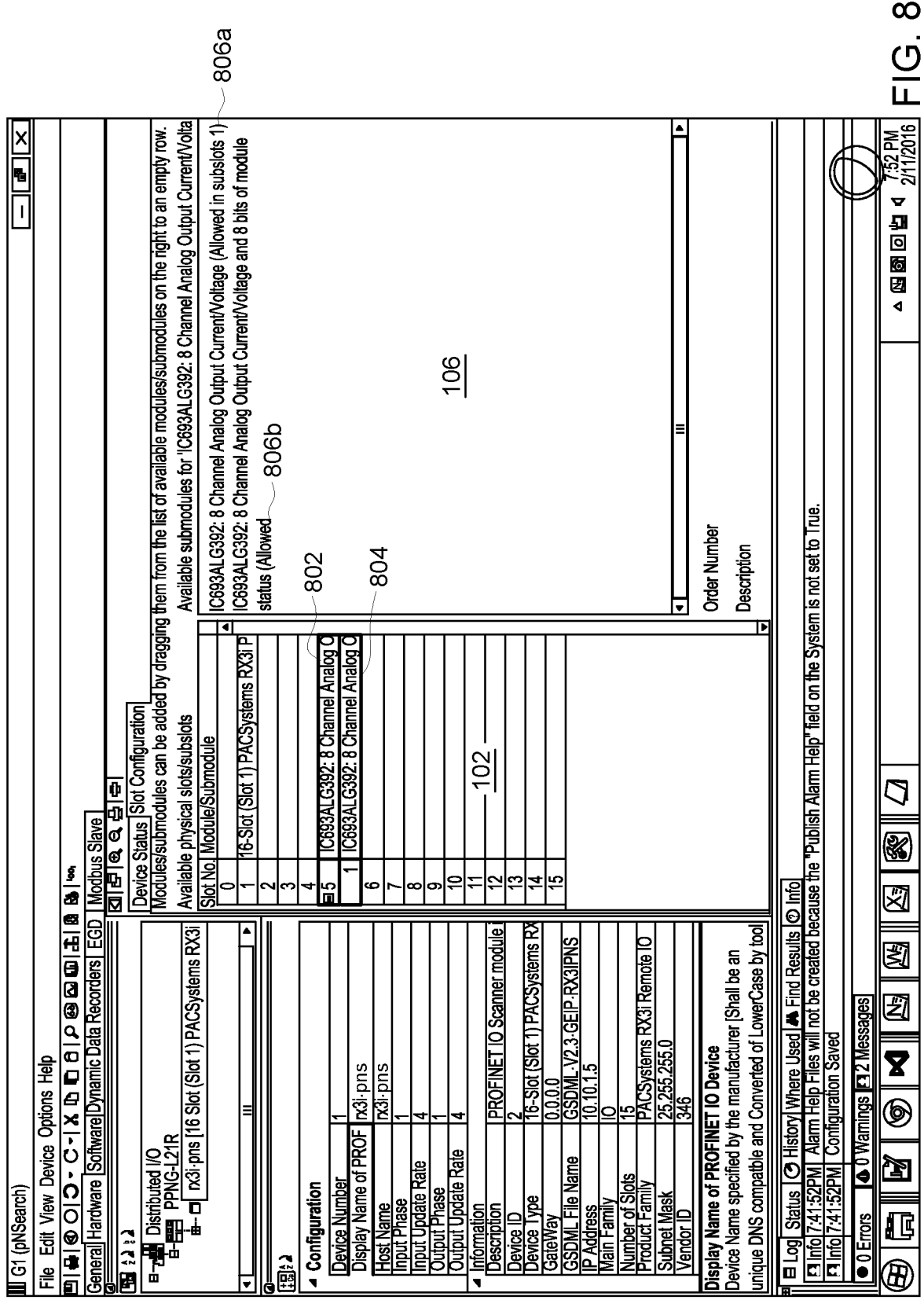
FIG. 8 is a screenshot of the development workplace with a submodule configured from a selection of a retrieved searched submodule, in accordance with an embodiment.

FIG. 8 is a screenshot of the development workplace with a submodule configured from a selection of a retrieved searched submodule. In FIG. 8, a module 802 located at "slot 5" is expanded to show an available submodule (shown as 804). Upon selection of the slot 5 sub-slot 1, the development workspace 100 presents a list of compatible submodules (shown as 806a and 806b). In FIG. 8, a compatible submodule is selected and configured to sub-slot 804.

Guided Configuration

In another aspect, the exemplified methods and systems facilitates, via the user interface, a guided interface to leverage historical retrieved parameters and information, previously build IO device configuration and its respective IO module configuration, and to publish popular IO-device-and-module configurations. In some embodiments, the exemplified methods and systems present configurations of previously-created IO modules and IO devices, which may be loaded to the development workspace to serve as a baseline or initial configuration for a given IO-device configuration project. In some embodiments, the exemplified methods and systems facilitates the presentation, the development workspace, of similar searches of compatible IO modules and submodules for a given IO device. In some embodiments, the exemplified methods and systems facilitates the publication of popular IO device configurations and their respective IO modules and submodules.

The exemplified methods and systems, in some embodiments, maintains a repository of previously built IO device configuration and respective IO module and submodule configuration. In some embodiments, the previously built IO device configuration is maintained in a configuration file associated with the development workspace. In some embodiments, the configuration file, or contents therein, is periodically updated, via a network, with a database to which the development workspace interfaces.

The exemplified methods and systems, in some embodiments, present configurations of previously-created IO modules and IO devices, which may be loaded to the development workspace to serve as a baseline or initial configuration for a given IO-device configuration project. In some embodiments, the development workspace may present popular or frequently used counter modules.

In some embodiments, the data associated with the previously-created IO modules and IO devices, the popular, or frequently used counter modules are included in the GSDML or XML file. In some embodiments, the development workspace retrieves the previously-created IO modules and IO devices, the popular, or frequently used counter modules from a database accessible to the development workspace over a network. In some embodiments, the database is maintained in a network area storage (NAS) or in a cloud environment.

Referring back to FIG. 5, the development workspace is shown presenting a list of frequently used modules. In FIG. 5, the frequently used module for the IO hardware device (e.g., 502 or 520) is a counter module (shown as "CM" 522). In some embodiments, the category and subcategory associated with the modules (shown as 524a and 524b) are also presented.

Figure 9:
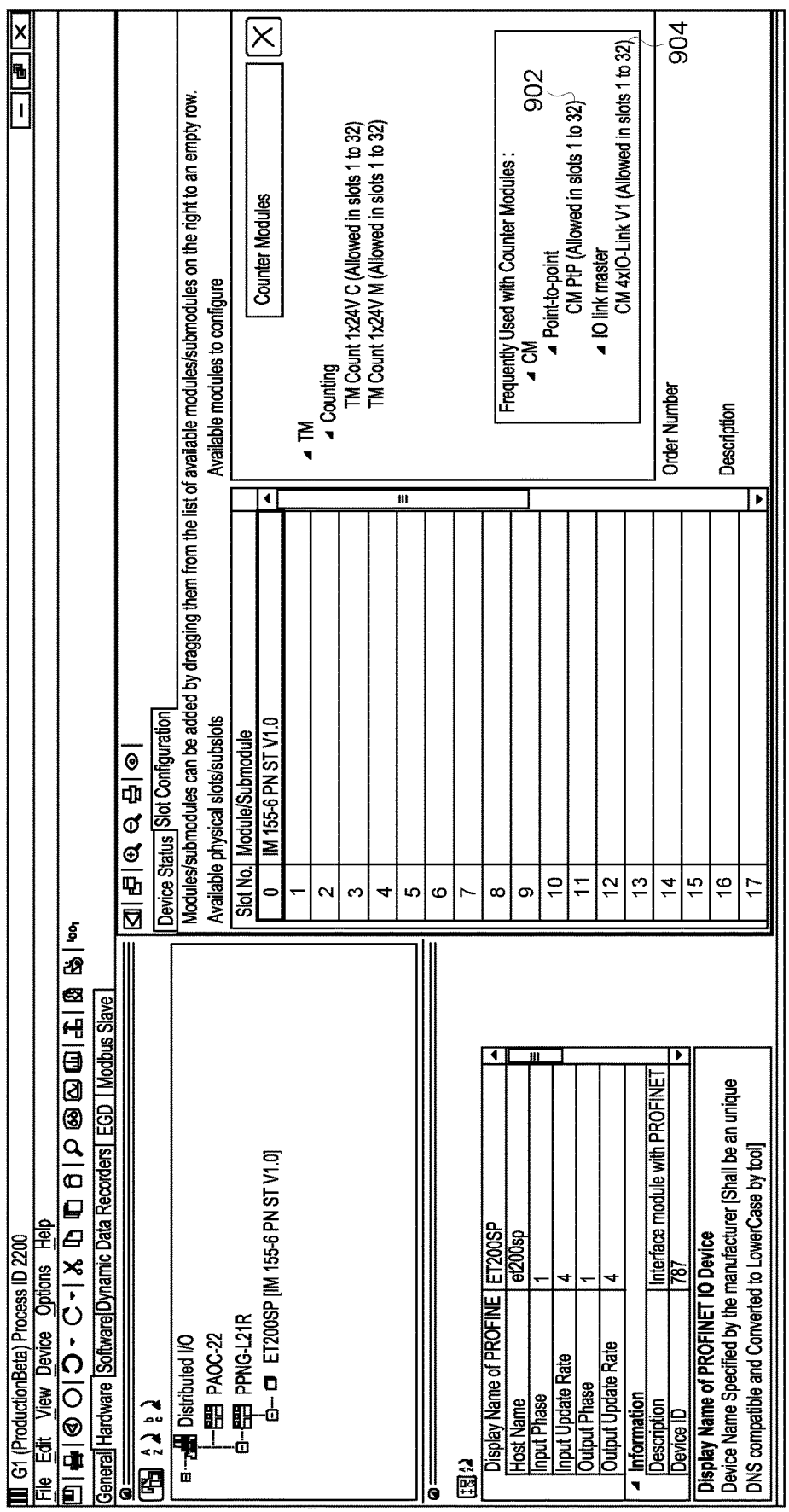
FIG. 9 is a screenshot of the development workspace presenting a list of modules frequently used with a searched module, in accordance with an embodiment.

FIG. 9 is a screenshot of the development workspace presenting a list of modules frequently used with a searched module. In FIG. 9, modules frequently used with counter modules are shown. Specifically, in response to a search for counter modules, the development workspace presents a second counter module (shown as "Point-to-Point CM PtP" 802) and a third counter module (shown as "IO link master CM 4xIO-Link V1" 804).

Other types of information may be maintained by the development workspace. In some embodiments, the exemplified methods and systems facilitates the presentation, the development workspace, of similar searches of compatible IO modules and submodules for a given IO device.

In some embodiments, the repository facilitates, in some embodiments, via the user interface, a guided interface to leverage historical retrieved parameters and information.

In some embodiments, the development workspace maintains a list of popular IO-device-and-module configurations. In some embodiments, a $3^{rd}$ party computing device (e.g., a cloud system) operatively receives IO-device-and-module configurations from each development workspace to determine the list of popular IO-device-and-module configurations.

Figure 10:
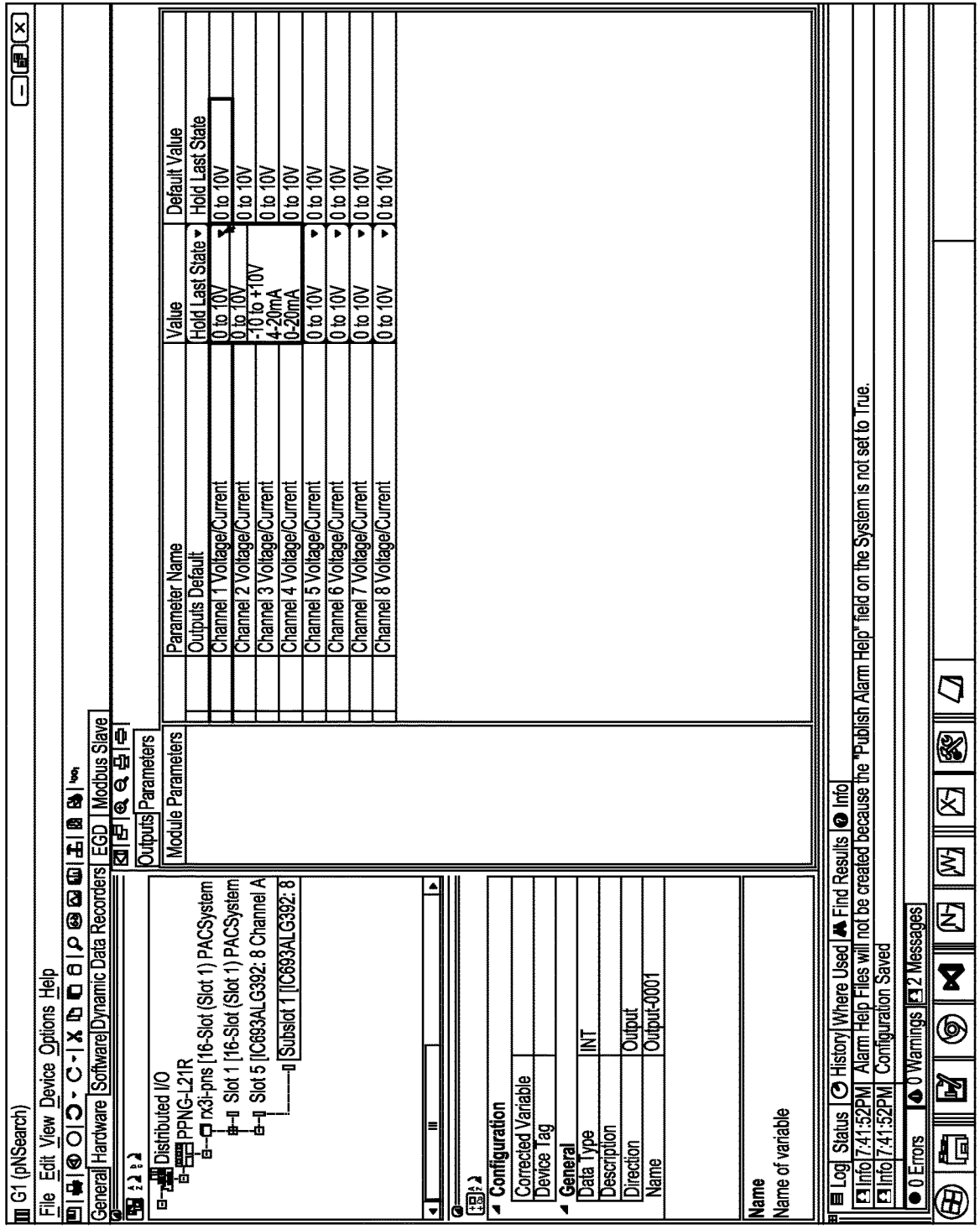
FIG. 10 is a screenshot of the development workspace of FIG. 1 having a panel to configure input and output settings for a given IO module or submodule, in accordance with an embodiment.

FIG. 10 is a screenshot of the development workspace of FIG. 1 having a panel to configure input and output settings for a given IO module or submodule. As shown in FIG. 10, analog output channels of the IO module are configurable as 0 to 10V, −10 to +10V, 4-20 mA, and 0-20 mA. These configurable parameters may be searched via the input text string 104 (shown in FIGS. 1-5).

Figure 11:
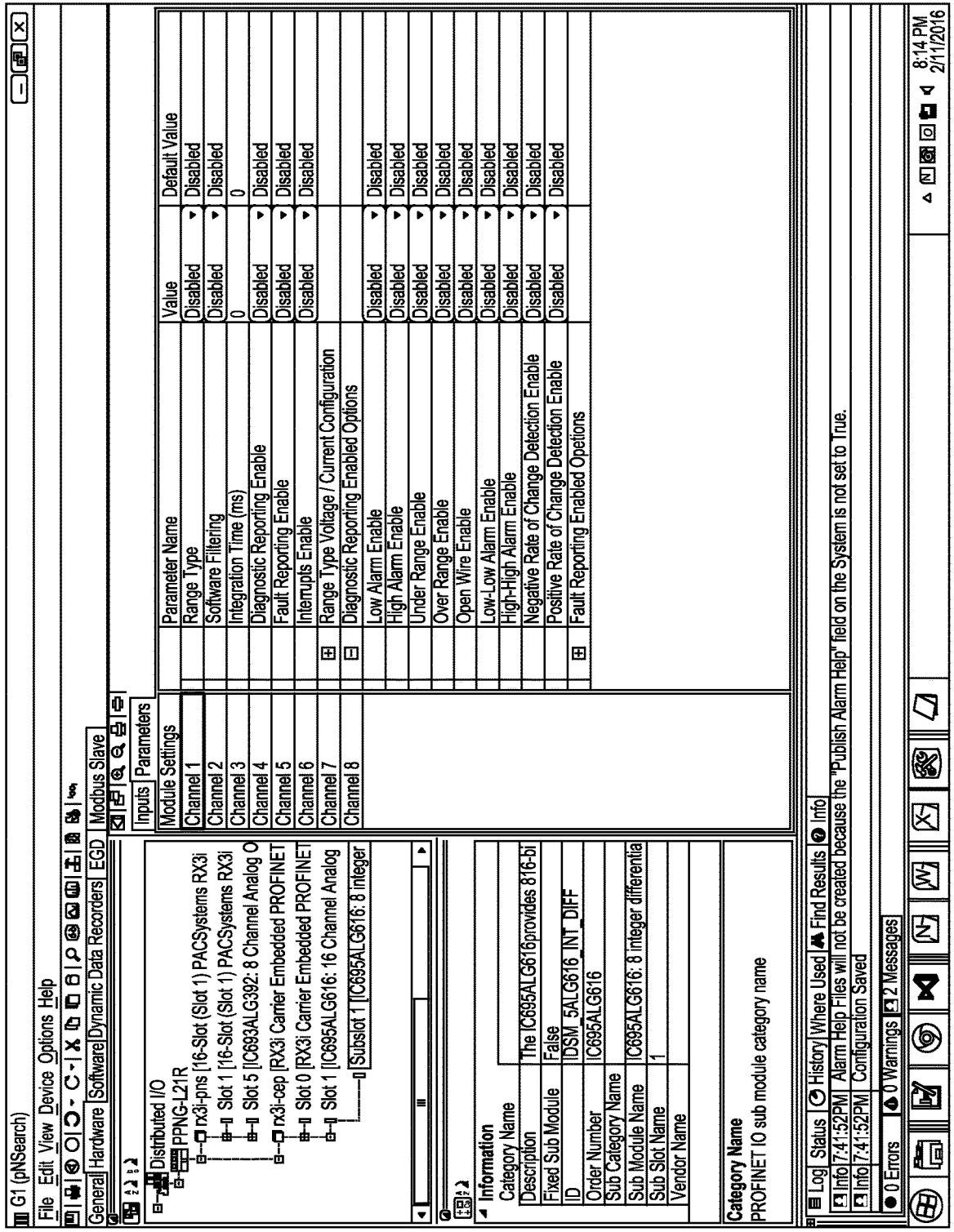
FIG. 11 is a screenshot of the development workspace for configuring settings of a given IO module or submodule, in accordance with an embodiment.

FIG. 11 is a screenshot of the development workspace of FIG. 1 having a panel to configure settings of a given IO module or submodule. As shown in FIG. 11, example settings include range type, software filtering, diagnostic reporting, fault reporting, low alarm, high alarm, under range notification, over range notification, open wire notification, low-low alarm, high-high alarm, negative range detection notification, and positive range detection notification. These configurable parameters are exemplary parameters to which the input text string 104 may also receive IO modules having such attributes or types.

FIG. 12 is a screenshot of an example interface for loading a GSDML file having a collection of IO parameters and configuration parameters associated with a given IO device. The GSDML files are, in some embodiments, stored in XML format.

Figure 13:
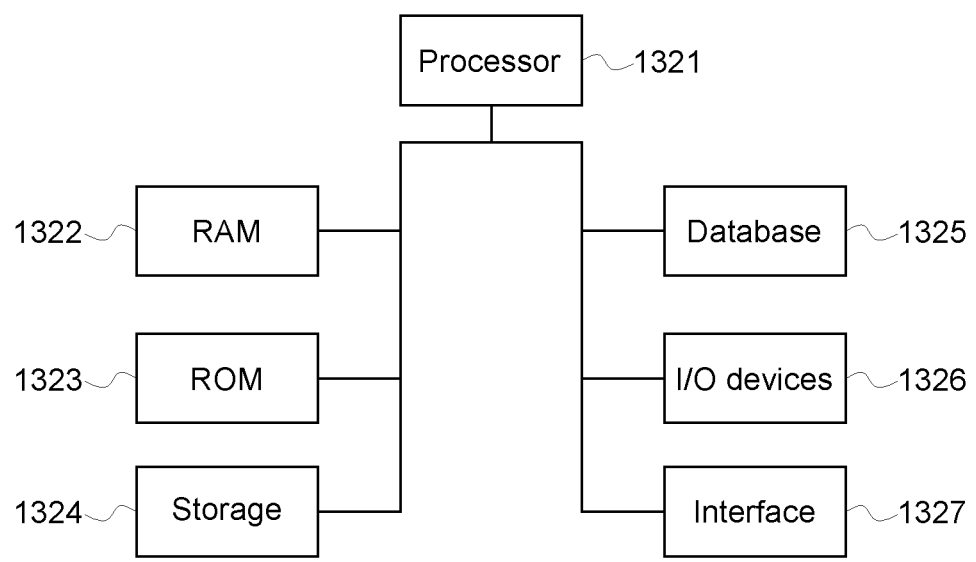
FIG. 13 illustrates an exemplary computer, e.g., that executes the development workspace, that can be used for configuring hardware devices in an industrial automation system, in accordance with an embodiment.

FIG. 13 illustrates an exemplary computer, e.g., that executes the development workspace, that can be used for configuring hardware devices in an industrial automation system. In various aspects, the computer of FIG. 13 may comprise all or a portion of the development workspace 100, as described herein. As used herein, "computer" may include a plurality of computers. The computers may include one or more hardware components such as, for example, a processor 1321, a random access memory (RAM) module 1322, a read-only memory (ROM) module 1323, a storage 1324, a database 1325, one or more input/output (I/O) devices 1326, and an interface 1327. Alternatively and/or additionally, controller 1320 may include one or more software components such as, for example, a computer-readable medium including computer executable instructions for performing a method associated with the exemplary embodiments. It is contemplated that one or more of the hardware components listed above may be implemented using software. For example, storage 1324 may include a software partition associated with one or more other hardware components. It is understood that the components listed above are exemplary only and not intended to be limiting.

Processor 1321 may include one or more processors, each configured to execute instructions and process data to perform one or more functions associated with a computer for indexing images. Processor 1321 may be communicatively coupled to RAM 1322, ROM 1323, storage 1324, database 1325, I/O devices 1326, and interface 1327. Processor 1321 may be configured to execute sequences of computer program instructions to perform various processes. The computer program instructions may be loaded into RAM 1322 for execution by processor 1321. As used herein, processor refers to a physical hardware device that executes encoded instructions for performing functions on inputs and creating outputs.

RAM 1322 and ROM 1323 may each include one or more devices for storing information associated with operation of processor 1321. For example, ROM 1323 may include a memory device configured to access and store information associated with controller 1320, including information for identifying, initializing, and monitoring the operation of one or more components and subsystems. RAM 1322 may include a memory device for storing data associated with one or more operations of processor 1321. For example, ROM 1323 may load instructions into RAM 1322 for execution by processor 1321.

Storage 1324 may include any type of mass storage device configured to store information that processor 1321 may need to perform processes consistent with the disclosed embodiments. For example, storage 1324 may include one or more magnetic and/or optical disk devices, such as hard drives, CD-ROMs, DVD-ROMs, or any other type of mass media device.

Database 1325 may include one or more software and/or hardware components that cooperate to store, organize, sort, filter, and/or arrange data used by controller 1320 and/or processor 1321. For example, database 1325 may store hardware and/or software configuration data associated with input-output hardware devices and controllers, as described herein. It is contemplated that database 1325 may store additional and/or different information than that listed above.

I/O devices 1326 may include one or more components configured to communicate information with a user associated with controller 1320. For example, I/O devices may include a console with an integrated keyboard and mouse to allow a user to maintain a database of images, update associations, and access digital content. I/O devices 1326 may also include a display including a graphical user interface (GUI) for outputting information on a monitor. I/O devices 1326 may also include peripheral devices such as, for example, a printer for printing information associated with controller 1320, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1327 may include one or more components configured to transmit and receive data via a communication network, such as the Internet, a local area network, a workstation peer-to-peer network, a direct link network, a wireless network, or any other suitable communication platform. For example, interface 1327 may include one or more modulators, demodulators, multiplexers, demultiplexers, network communication devices, wireless devices, antennas, modems, and any other type of device configured to enable data communication via a communication network.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain. It will be apparent to those skilled in the art that various modifications and variations.

What is claimed is:

1. A method of configuring a hardware device in an industrial automation system, the method implemented on a computing device comprising at least one processor in communication with at least one memory device, the method comprising:

storing, in a database, a plurality of hardware description files for a plurality of input-output (IO) modules each operatively connectable to a slot of an IO hardware device, each of the plurality of hardware description files including at least one hardware description value;

generating instructions for a processor to display, via a display, a user interface including (i) a first pane comprising one or more graphical elements each corresponding to a respective IO module slot associated with the IO hardware device, and (ii) a search input comprising a graphical element corresponding to an input text field;

receiving, via the input text field of the user interface, an input character string;

filtering, by the processor, the plurality of hardware description files in the database based on the received input character string to determine one or more matched IO modules of the plurality of IO modules, wherein each matched IO module of the one or more matched IO modules is compatibly associated with the IO hardware device, and wherein each matched IO module of the one or more matched IO modules has a hardware description value matching the input character string;

generating instructions for the processor to display via the display, in the user interface, a second pane having one or more graphical elements each corresponding to a given matched IO module;

receiving, via a user selection on the second pane, a selection of a matched IO module in the second pane and a selection of an IO module slot in the first pane;

generating instructions for the processor to update, in the first pane, the graphical element associated with the selected IO module slot with a graphical element associated with the selected IO module;

retrieving, by the processor, hardware configuration data associated with the selected IO module; and updating, by the processor, a software configuration of the user interface, wherein the software configuration is subsequently converted to configuration instructions to be transmitted to the IO hardware device to cause hardware configuration of at least one of the plurality of IO modules operatively connectable thereto, to thereby configure the IO hardware device to utilize the selected IO module.

2. The method of claim 1, wherein the first and second panes proximally border each other.

3. The method of claim 1, wherein the graphical element corresponding to the input text field is presented in a pane selected from the group consisting of the first pane, the second pane, and a third pane of the user interface.

4. The method of claim 1, wherein filtering, by the processor, the plurality of hardware description files in the database based on the received input character string further comprises comparing the input character string to each hardware description value of each hardware description file for the plurality of IO modules compatibly associated with the IO hardware device.

5. The method of claim 4, wherein the at least one hardware description value of each hardware description file for each IO module indicates at least one of a number of analog inputs, a number of analog outputs, a number of digital inputs, and a number of digital outputs.

6. The method of claim 1, wherein the input character string comprises a string value corresponding to a slot-compatible search, and wherein the filtering further comprises:

parsing, by the processor, each hardware description file of each IO module compatibly associated with the IO hardware device;

generating instructions for the processor to display, via the display, on the second pane of the user interface, a graphical element corresponding for each matched IO module of the one or more matched IO modules, each matched IO module having a hardware description value corresponding to have a respective operable slot range value, wherein each respective operable slot range value includes the string value corresponding to the slot-compatible search.

7. The method of claim 6, wherein the parsing of each hardware description file of each IO module compatibly associated with the IO hardware device further comprises:

parsing each of the at least hardware description value for each hardware description file associated with each IO module compatibly associated with the IO hardware device.

8. The method of claim 6, wherein of parsing the plurality of hardware description files of all IO modules compatibly associated with the IO hardware device comprises:

determining a description type for the input character string from a list of potential description types; and parsing hardware description values of the plurality of hardware description files associated with the determined description type for each given IO module.

9. The method of claim 1, wherein the input character string comprises a string value corresponding to a power-limit-compatible search, and the method further comprising:

determining, by the processor, an available power value for the IO hardware device by subtracting a maximum available power value for the IO hardware device with a current power usage value for a current configuration of the IO hardware device;

parsing, by the processor, from each hardware description file, respective hardware description values associated with respective power requirements of each IO module compatibly associated with the IO hardware device; and generating instructions for a processor to display, via the display, in the user interface a graphical element for each given matched IO module of the one or more matched IO modules, each given matched IO having, in the hardware description file corresponding to the given matched IO module, a hardware description value associated with a power requirement of the given matched IO module, wherein the power requirement of the given matched IO module is less than the determined available power value.

10. The method of claim 9, further comprising:

generating instructions for the processor to display, via the display, in the user interface, a graphical representation of the available power value for the IO hardware device.

11. The method of claim 1, wherein the input character string comprises a string value corresponding to a temperature compatible search, and the method further comprising:

parsing, by the processor, the at least one hardware description value for each hardware description file for each IO module compatibly associated with the IO hardware device; and generating instructions for the processor to display, via the display, on the second pane of the user interface, a graphical element for each hardware description file for given matched IO module, wherein the respective hardware description file for each given matched IO module has a particular hardware description value indicating an operable temperature range, wherein the value indicating the operable temperature operating range corresponds to the string value corresponding to the temperature compatible search.

12. The method of claim 1, wherein the input character string comprises a string corresponding to a dimensions-compatible search, the method comprising:

parsing, by the processor, the at least one hardware description value of each hardware description file for each IO module compatibly associated with the IO hardware device; and generating instructions for the processor to display, via the display, on the second panel of the user interface, a graphical element for each given matched IO module, wherein the respective hardware description file for each given matched IO module has a hardware description value indicating a maximum dimension, the maximum dimension being less than a value determined from the string corresponding to the dimensions-compatible search.

13. The method of claim 1, wherein the input character string comprises a string type corresponding to a search parameter wherein the search parameter includes at least one of Maximum Dimensions, Minimum Operating Temperature, Maximum Operating Temperature, Number of Port connectors, Minimum Update rate support, Number of analog IO channels per module, Number of digital IO channels per module, Number of temperature IO channels per module, Maximum IO data rate per device, and Number of Daps supported, and the method further comprising:

determining, by the processor, a hardware description type associated with the string type;

parsing, by the processor, the at least one hardware description value of each hardware description file for each IO module compatibly associated with the IO hardware device; and generating instructions for the processor to display, via the display, on the second pane of the user interface, a graphical element for each IO module having a hardware description determined to have a value that matches the search parameter.

14. The method of claim 1 further comprising:

generating instructions for the processor to display, via the display, in the user interface, a graphical representation of an IO module configuration for a past-built IO hardware device, wherein the past-built IO hardware device has a first slot configuration and a second slot configuration, wherein the first slot configuration is identical to the second slot configuration.

15. The method of claim 1 further comprising:

generating instructions for the processor to display, via the display, in the user interface, a graphical representation of one or more historical search strings submitted for the IO hardware device, wherein the one or more historical search strings include a portion of the input character string.

16. The method of claim 1 further comprising:

generating instructions for the processor to display, via the display, a plurality of graphical representations of most used IO modules for the IO hardware device.

17. The method of claim 1, further comprising:

storing, in a database, a plurality of further hardware description files, each further hardware description file of the plurality of further hardware description files corresponding to a respective one of a plurality of IO submodules;

generating instructions for the processor to display, via the display, on the first pane of the user interface, one or more second graphical elements each corresponding to a respective IO submodule slot associated with the IO hardware device;

filtering, by the processor, the plurality of hardware description files for the plurality of IO submodules in the database based on the received input character string to determine one or more matched IO submodules, wherein each matched IO submodule of the one or more matched IO submodules is compatibly associated with the IO hardware device, having a hardware description value matching the input character string;

generating instructions for the processor to display, via the display, on the second pane of the user interface, one or more second graphical elements each corresponding to a given matched IO submodule of the one or more matched IO submodules;

receiving, via a user, (i) a first selection, on the second pane, of a particular one of the one or more matched IO submodules, and (ii) a second selection, in the first pane, of a particular one of the one or more second graphical elements corresponding to respective IO submodule slots; and generating instructions for the processor to update, in the first pane, the particular one of the one or more second graphical elements slot with a graphical element associated with the selected IO submodule.

18. A system of configuring an input-output (IO) hardware device in an industrial automation system via a user interface for configuring hardware configuration of a plurality of IO modules each operatively connectable to a slot of the IO hardware device, the system comprising:

a processor;

a memory having instructions stored thereon, wherein the instructions, when executed by the processor, cause the processor to:

store in a database, a plurality of hardware description files for a plurality of IO modules each operatively connectable to a slot of an IO hardware device, each of the plurality of hardware description files including at least one hardware description value;

generate instructions for a processor to display, via a display a user interface (i) a first pane comprising one or more graphical elements each corresponding to an IO module slot associated with the IO hardware device, and (ii) a search input comprising a graphical element corresponding to an input text field;

receive, via the input text field of the user interface, an input character string;

filter, by the processor, the plurality of hardware description files in the database based on the received input character string to determine one or more matched IO modules of the plurality of IO modules, wherein each matched IO module of the one or more matched IO modules is compatibly associated with the IO hardware device, and wherein each matched IO module of the one or more matched IO modules has a hardware description value associated with the identified description type and matching the input character string;

generate instructions for a processor to display, via the display, in the user interface, a second pane having one or more graphical elements each corresponding to a given matched IO module;

receive, via a user selection on the second pane, a selection of a matched IO module in the second pane, and a selection of an IO module slot in the first pane;

generate instructions for the processor to update, in the first pane, the graphical element associated with the selected IO module slot with a graphical element associated with the selected IO module;

retrieve, by the processor, hardware configuration data associated with the selected IO module; and update, by the processor, a software configuration of the user interface, wherein the software configuration is subsequently converted to configuration instructions to be transmitted to the IO hardware device to cause hardware configuration of at least one of the plurality of IO modules operatively connectable thereto, to thereby configure the IO hardware device to utilize the selected IO module.

\* \* \* \* \*